Nov. 27, 1923.

Re. 15,726

A. B. COHN

FRICTION DRIVE FOR SEWING MACHINES

Original Filed May 2, 1917

INVENTOR.
Alexander Cohn
BY Jas. H. Griffin
ATTORNEYS.

Reissued Nov. 27, 1923.

Re. 15,726

UNITED STATES PATENT OFFICE.

ALEXANDER B. COHN, OF NEW YORK, N. Y.

FRICTION DRIVE FOR SEWING MACHINES.

Original No. 1,359,153, dated November 16, 1920, Serial No. 165,947, filed May 2, 1917. Application for reissue filed September 9, 1921. Serial No. 499,566.

*To all whom it may concern:*

Be it known that I, ALEXANDER B. COHN, a citizen of the United States, residing at New York city, borough of Manhattan, in the county and State of New York, have invented new and useful Improvements in Friction Drives for Sewing Machines, of which the following is a specification.

This invention relates to power transmitting mechanism and has for an object to provide improved mechanism of this character for service in conjunction with sewing machines, whereby the operation of the latter will be subject to the convenient control of their respective operators.

Another object of the invention resides in equipping sewing machines, of the type utilized in factories and similar establishments, with novel power imparting means, consisting of a swinging wheel operable to be brought into contact with a constantly rotated driver wheel by a simple movement of the operator's knee whereby the movement will be imparted to the former wheel to effect the operation of a sewing machine, the mechanism being so constructed that upon removal of the operator's knee therefrom the sewing machine will be automatically stopped.

Other objects will be in part obvious and in part pointed out hereinafter.

The invention accordingly consists in the novel features of construction, combination of elements and arrangement of parts, hereinafter more fully described, and pointed out particularly in the appended claims.

In the drawing.

Similar characters of reference denote like parts throughout the several views of the drawing.

Figure 1:
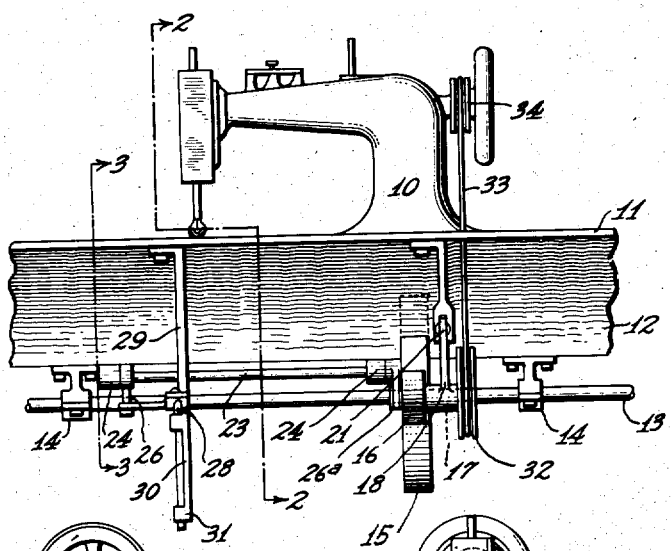
Figure 1 is a front elevation of the sewing machine driving mechanism comprising the preferred embodiment of the present invention.
Figure 2:
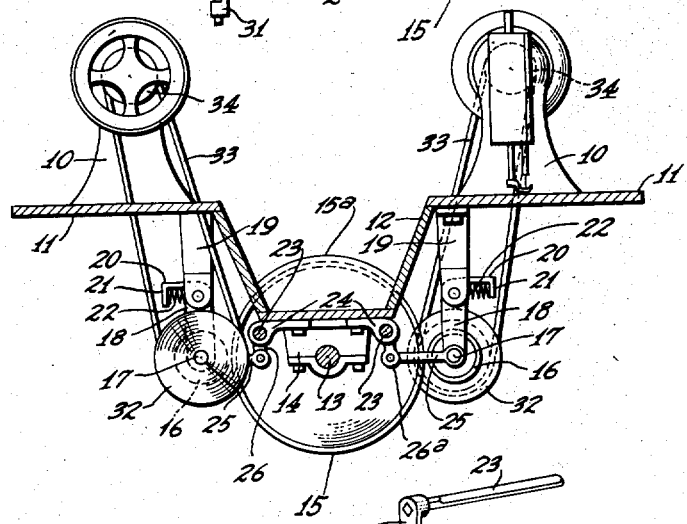
Figure 2 is a transverse sectional view taken along the line 2—2 of Fig. 1.
Figure 3:
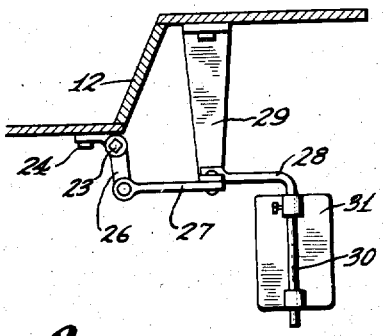
Figure 3 is a similar view, the plane of which being disclosed by the line 3—3 of Fig. 1.
Figure 4:
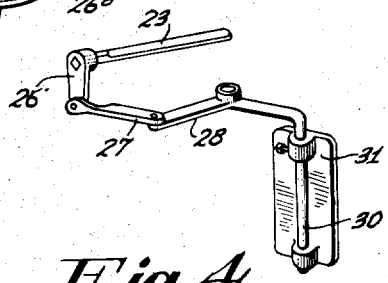
Figure 4 is a detail perspective view of the shifting levers.

Referring more particularly to the structural detail of the invention, the invention is employed in connection with one or more sewing machines 10, the latter being of any standard make or design, and are preferably mounted upon a suitable support or table 11. In factories and the like the machines 10 are usually arranged in parallel rows, and are adapted to have power furnished to the same through the agency of a driven shaft journaled in bearings situated between the rows of sewing machines, and disposed beneath the garment-receiving trough 12. Rather complicated and inconveniently operated controlling mechanism has hitherto been employed to transmit rotary motion from the driver shaft to the sewing machines, and it is the aim of the present invention to simplify and improve such mechanism so as to render its operation more effective and efficient.

To this end a driver shaft 13 is journaled for rotation within bearings 14, secured to and depending from the under surface of the trough 12, and said shaft is adapted to carry one or more keyed driver wheels 15, the latter being proportioned one to each group of two machines. The wheels 15 may be formed from any desired material, such as will be efficient when employed in friction gearing.

In the trough 12 and disposed transversely thereof is a housing or pocket 15[a] for the driving member or driver wheel 15 which housing serves the additional function of a partition to divide the trough 12 into compartments. The walls of said pocket project into the trough as shown.

Adapted to operate with each of the wheels 15 are driven wheels 16, each of the latter being carried by shafts 17, rotatably journaled in swinging bearings 18, pivoted to the lower bifurcated extremities of hanger brackets 19, said brackets being suitably secured to the under surfaces of the table 11, and extend downwardly on substantially vertical planes. The upper ends of the bearings 18 are formed to provide angularly extending arms 20, terminating in downwardly disposed offset extremities 21. Coiled springs 22 are interposed between the extremities 21 and the lower ends of the fixed brackets 19, and serve to oscillate the bearings 18 outwardly, so that the wheels 16 will normally be maintained out of frictional contact with the driver wheel 15.

In order to force the wheels 16 into engagement with the drivers 15, use is made of shafts 23, which are rotatably mounted within fixed bearings 24, secured to the lower wall of the trough 12, or any other convenient position. Fixed crank arms are provided upon the inner ends of the shafts 23, and extending from said arms to the bearings 18 are connecting links 25, whereby upon the rotation of the shafts 23, the brackets will oscillate to bring the wheels 16 into engagement with the driver wheels 15.

To effect the rotation of the shafts 23, the outer extremities of the latter are provided with fixed depending crank arms 26, which are connected by means of links 27, to the extremities of bell crank lever 28, the latter being pivotally supported by means of brackets 29, depending from the table 11. The levers 28 are provided with downwardly extending arms 30, on which are adjustably mounted knee plates 31, the latter being preferably located contiguous to the left knees of operators governing the sewing machines. Thus it will be evident that by slightly pressing the plates 31, the driven rollers will be brought into engagement with the driver wheels so that the shafts carrying said rollers will be thrown into a state of rotation.

The movement of the last mentioned shafts is imparted to the machines 10 by providing pulley wheels 32 thereon, and belts or their equivalents 33 are trained over said pulleys and over similar elements 34 carried by the drive shafts of the sewing machines, whereby when the rollers are in engagement with the driver wheels, the machines will be in active operation, but when the plates 31 are released, said rollers will be thrust away from the drivers to effect the stopping of said sewing machines.

From the foregoing it will be seen that there is provided mechanism whereby the objects of the invention have been achieved, and that all of the advantageous features above mentioned are, among others, present. The mechanism is of a substantial, simple and efficient character, reliable and effective in operation, and not likely to become out of order. The movable part of the mechanism may be incased if desired so as to prevent lint, dust and like foreign matter from collecting on and interfering with the operation thereof.

Having described the invention what is claimed is:

1. The combination of a table, a sewing machine mounted thereon, a driver wheel supported below the table, a hanger bracket on the table, a bearing pivotally connected to said hanger bracket and arranged to swing toward and from the driver wheel and having an angularly disposed arm and an angularly disposed extremity on said arm and spaced from the hanger bracket, a coiled spring interposed between said extremity and the hanger bracket, means carried by said bearing for deriving motion from the driver wheel, a driving connection intermediate said means and the machine on the table, a rock-shaft having cranks one of which is connected with the said bearing, a bell crank lever, a connection to other crank of the rock-shaft and one arm of said lever, and an angularly disposed portion on the other arm of the bell crank lever and carrying a knee plate.

2. In a power driven sewing machine, the combination of a table, a sewing machine mounted thereon and provided with an operating shaft, a driver wheel below the table, a bearing connected with the table and mounted for swinging movement thereon toward and away from the driver wheel, rotatable means carried by the swinging bracket and adapted to be carried by the bracket into and out of engagement with the driver wheel, a driving connection between the rotatable means and the operating shaft of the machine, a member adapted to be moved by the knee of the operator, and a connection between the knee operated member and the swinging bearing, whereby said member may be actuated by the knee of the operator to bring the rotatable member into engagement with the driver wheel or permit the rotatable member to retract therefrom.

In testimony whereof, I affix my signature.

ALEXANDER B. COHN.